Sept. 12, 1967   R. L. MEADE   3,340,620
TRAINING APPARATUS
Filed Sept. 20, 1965
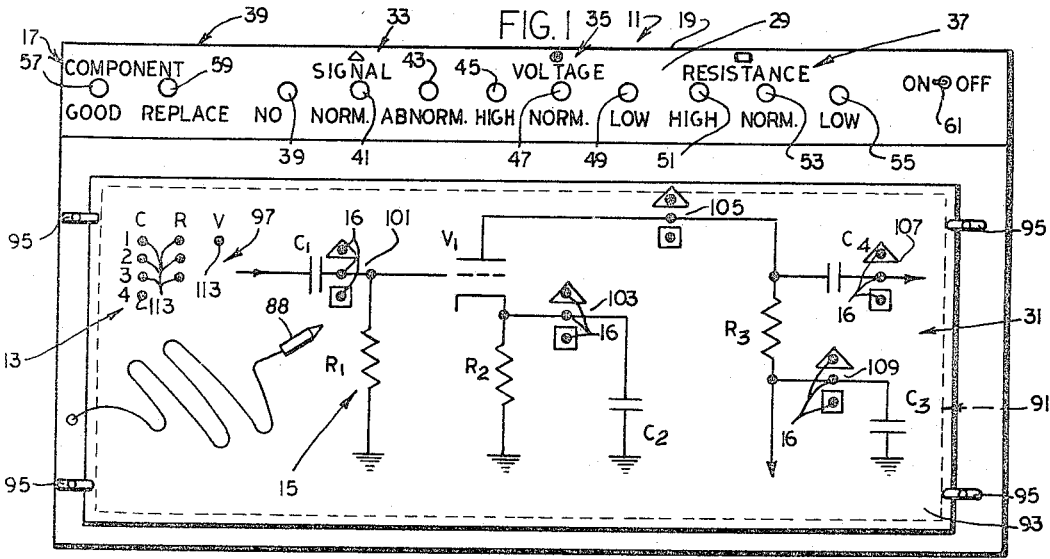
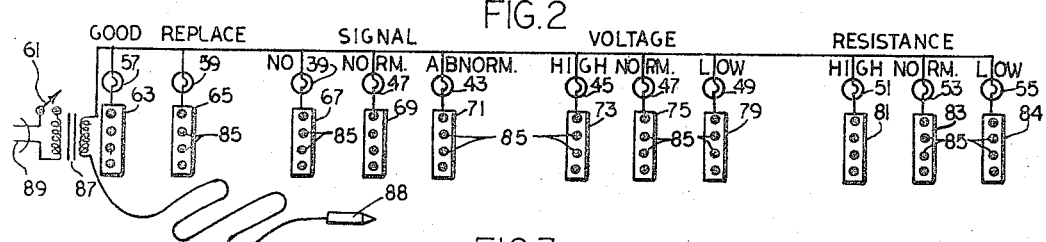
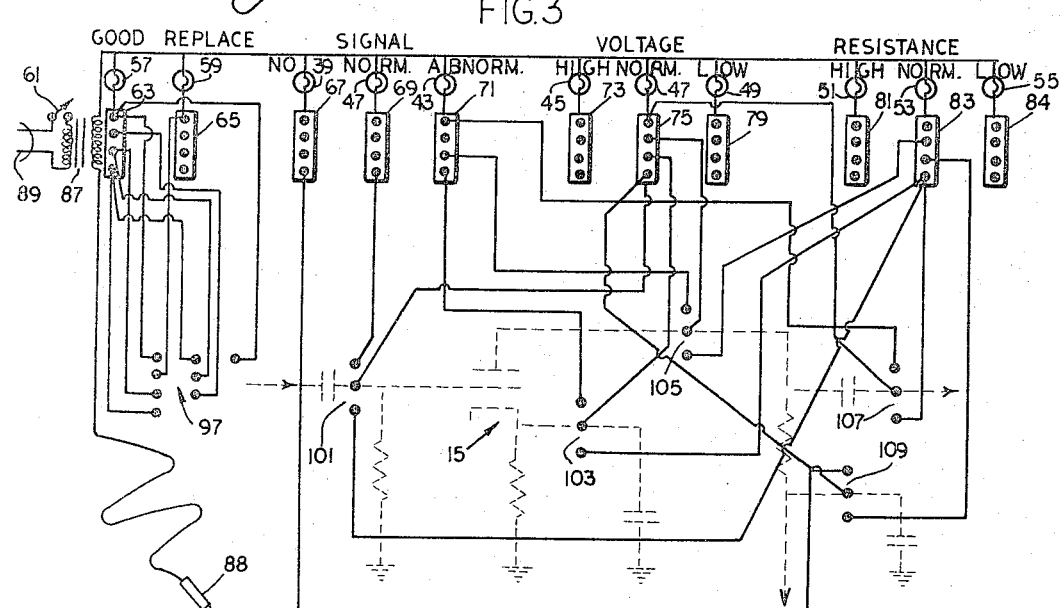
INVENTOR.
RUSSELL L. MEADE United States Patent Office 3,340,620
Patented Sept. 12, 1967

3,340,620
TRAINING APPARATUS
Russell L. Meade, 205 Terrydale Drive,
Marietta, Ga. 30060
Filed Sept. 20, 1965, Ser. No. 488,644
8 Claims. (Cl. 35—19)

This invention generally relates to a training apparatus and more particularly, to an apparatus particularly adapted to facilitate instruction in system, circuit and component failure analysis, and most particularly to an apparatus for teaching trouble-shooting to beginners or trainees in various fields.

Heretofore, instruction aids facilitating instruction in electronic system, circuit and component failure analysis have usually consisted of an assembled circuit into which defective components are introduced by the instructor. The circuit so provided may be then energized and a variety of electronic test instruments, such as voltmeters, ohmmeters, etc., used for the analysis thereof. From the analysis, the trainee is taught to determine the trouble and identify any defective component or components. Since the circuit components used are usually of relatively small size, the number of individuals which may view such presentations is limited. Further, the cost involved in constructing such circuits and the cost of instruments used in the analysis thereof is often quite high.

There is the additional problem that such circuits and instruments when used by tyros may result in damage to expensive circuit components and meters. In the training apparatus of the present invention, the failure analysis closely simulates the analysis of real circuits with conventional instruments without the need for any electronic components or test equipment. A circuit diagram of the circuit being analyzed is depicted upon a test board with a test station at each of a plurality of positions in the circuit. A plurality of fixed contact points are disposed at at least one of the stations in order that a plurality of tests can be made at that station, as is possible in the circuit simulated. A test probe, substantially identical to an instrument test probe, is used to make contact with various of the fixed contact points, as selected by the student, whereupon respective indicating lamps indicate the conditions at the respective stations, which indications simulate the indications provided by conventional instruments in testing the conditions at the respective stations of the circuit depicted. From such indications the student is able to determine the cause of the circuit failure and identify the component or components that have failed.

Therefore, a main object of this invention is to provide an improved training apparatus particularly adapted to facilitate instruction in system, circuit or component failure analysis. Another object of this invention is to provide an economical training apparatus which will provide a student with a realistic learning environment. A particular object of the illustrated embodiment is to provide a training apparatus which is adapted for facilitating instruction with a large variety of electrical circuits. Other objects and advantages of the invention will become apparent through reference to the following description and accompanying drawing which shows an illustrative embodiment of this invention in which:

FIGURE 1 is a plan view of a training apparatus embodying certain features of this invention and showing an exemplary circuit to be tested;

FIGURE 2 is a circuit diagram of the apparatus illustrated in FIGURE 1 without the exemplary circuit; and FIGURE 3 is a circuit diagram of the embodiment illustrated in FIGURE 1 showing the connections for the exemplary circuit illustrated therein.

The apparatus 11 illustrated comprises a generally flat display surface 13 having a symbolic diagram 15 of a system to be analyzed illustrated thereon. It should be noted that while the following discussion is particularly directed toward the application of the apparatus 11 to an electrical circuit, certain features of this invention may find application in apparatus for training in fluid flow, pneumatics and the like. For test purposes there are test stations at various points in the circuit to be tested and at each test station there is a plurality of contact points 16 fixed to the surface 13. The apparatus 11 further includes a plurality of indicating means 17 selectively connectable to particular fixed contacts 16 provided upon the circuit diagram 15. As will be described in greater detail below, when any one of the fixed contacts 16 is energized by the trainee, a particular indicating means 17 is actuated, thereby providing information with regard to selected conditions which exist at the test station corresponding to the circuit position.

The illustrated embodiment comprises a rectangular chassis or cabinet 19 having the viewing surface 13 on top. The surface 13 is generally divided into a dynamic response area 29 and a circuit area 31. Referring to the dynamic response area 29 of the cabinet 19, as illustrated in FIGURE 1, the indicating means 17 comprises three groups 33, 35 and 37 of three indicator lamps each and one group 39 of two lamps. Group 33 is designated "Signal" and the lamps 39, 41 and 43 within the group respectively designated "No," "Norm" (normal) and "Abnorm" (abnormal). Group 35 is designated "Voltage" and the indicator lamps 45, 47 and 49 within the group are respectively designated "High," "Norm" (normal) and "Low." Group 37 is provided with the designation "Resistance" and the lamps 51, 53 and 55 within the group are respectively designated "High," "Norm" (normal) and "Low."

For purposes to be hereinafter more fully considered, the "Signal" group 33 is further designated with the geometric symbol "△," the "Voltage" group 35 with the symbol "⊙" and the "Resistance" group 37 with the symbol "□." If desired, the geometric symbols may be deleted and the groups suitably color coded. Group 39 is designated "Component," and the lamps 57 and 59 are respectively designated "Good" and "Replace." A single pole toggle switch 61 for energizing the apparatus 11 may also be disposed in the dynamic response area, as shown.

Referring to FIGURE 2, a plurality of wires or bus bars 63, 65, 67, 69, 71, 73, 75, 79, 81, 83 and 84 is provided, each being connected by suitable means to one terminal of a respective indicator lamp as illustrated. In the illustrated embodiment the bus bars are mounted upon one of the inner walls of the cabinet 19. To facilitate rapid connection to the bus bars, as will hereinafter be more fully described, a plurality of snaps 85 are secured to the bus bars. The remaining terminals of the indicator lamps are coupled through the secondary of a step-down transformer 87 to a test probe 88. The primary of the transformer 87 is coupled through the switch 61 to a power source, which may be a conventional 60 cycle main, by means of a plug 89. In the illustrated embodiment, the secondary of the transformer provides 6.3 volts for energization of the indicator lamps.

Referring to FIGURE 1, the circuit area 31 of the cabinet 19 is provided with a rectangular shaped cut-out 91 over which a circuit board or card 93 is positioned. The card 93 is constructed of an electrically insulating material, such as fiberboard, secured to the surface of the cabinet 19 by suitable latches 95. Positioned in the upper left corner of the circuit card 93 as viewed in FIGURE 1 is a component verification array 97. The vertical rows of the array 97 are designated R (referring to resistors), C (referring to capacitors) and V (referring to tubes). While the illustrated circuit includes resistors, capacitors and tubes, other circuits may be displayed and the array 97 modified to designate inductors, transformers, speakers or other elements. The horizontal rows of the array 97 are designated by numbers which, in the illustrated embodiment, range from 1 to 4.

Printed or otherwise formed upon the surface of the card 93 is a diagram 15 of a representative circuit including a plurality of system components, as illustrated a symbolic representation of a conventional resistance-coupled audio amplifier comprising capacitors $C_1$, $C_2$, $C_3$ and $C_4$, resistors $R_1$, $R_2$ and $R_3$ and vacuum tube $V_1$, connected as shown. If desired, the circuit diagram may alternatively be represented by a pictorial diagram of the circuit components. To facilitate wiring the test card 93 to the signaling means 17 an image of the circuit diagram 15 is printed upon the reverse side of the card 93 so that the components of both diagrams will have corresponding positions.

The illustrated embodiment is provided with five test stations 101, 103, 105, 107 and 109 corresponding to component terminals. Each of the test stations is provided with three fixed contacts 16 which, in the illustrated embodiment, are in the form of screws or rivets which pass through the card 93. Around the upper-most fixed contact of each of the stations, the geometric symbol "△" is provided, which corresponds to the symbol of the signal group of lamps 33. The center contact 16 of each of the stations is disposed on the circuit lead and is left unencircled to indicate the code symbol "⊙" corresponding to the symbol of the voltage group of lamps 35, and the lower-most contact of each station is surrounded with the symbol "□" corresponding to the symbol of the resistance group of lamps 37. (Should the contacts be disposed in horizontal relationship, the left one is preferably identified by "△" and the right one by a "□.") A respective flexible wire lead which is secured to a respective fixed contact 16 upon the under side of the card 93. The free end of each of the leads is provided with a snap for detachably engaging a respective snap 85.

The array 97 is composed of contacts 113 fixed to the surface of the card 93. As previously mentioned the vertical columns are alphabetically designated and the horizontal rows numerically designated. Each of the circuit components is associated with a particular fixed contact within the array. For example, contact $C_3$ corresponds to a bypass capacitor identified as $C_3$ in the circuit diagram. So that the contacts 113 may be detachably connected to the snaps 85, flexible conductors are secured to the contacts 113 upon the reverse side of the card 93 and the free ends of the conductors are provided with snaps for mating engagement with snaps 85.

While the illustrated apparatus is shown in conjunction with a resistance coupled audio amplifier, other circuit configurations may, of course, be provided. Referring to FIGURE 3, the card 93 may be connected into the apparatus 11 in the following manner. The card 93 is positioned over the cut-out 91 of the cabinet 19 and secured thereto by the latches 95. The cabinet is turned over so that the circuit printed upon the back side of the card 93 is visible. The desired electrical connections are then made. To facilitate understanding of the connections, the circuit 15 shown in FIGURE 1 as printed on the surface of the card 93 is shown in phantom in FIGURE 3.

For purposes of illustration it will be assumed that the apparatus 11 is to be wired to reflect an open capacitor $C_2$. With an open capacitor $C_2$, an abnormal signal would be developed in the actual circuit at test points 103, 105 and 107. The signal would remain normal at test point 101, and there would remain no signal at test point 109. All voltages and resistances as measured at the various test points would remain normal. The instructor therefore connects the fixed contacts having the symbol "△" to the signal indicator 33 in the following manner: station 101 is connected to the bus bar 69; station 109 is connected to the bus bar 67; and stations 103, 105 and 107 are connected to the bus bar 71. He connects the center fixed contacts to the voltage indicating means 35 in the following manner: stations 101, 103, 105, 107 and 109 are all connected to the bus bar 75. He connects the fixed contacts designated "□" to the resistance indicator 37 in the following manner: stations 101, 103, 105, 107 and 109 are all connected to bus bar 83. The snap fasteners provided upon the ends of the conductors secured to the fixed contacts and the snaps 85 of the bus bars greatly facilitate making these connections in the apparatus 11. The fixed contact 113 of the component array 97 corresponding to $C_2$ is connected to the bus bar 65, and the remaining fixed contacts are connected to the bus bar 63. Thus, the device is wired and ready for use by the trainee.

The student or trainee is given the apparatus as prepared by the instructor and may be told some symptom of malfunction as would be observed by the customer in seeking repair. For example, the symptom may be that the signal output is abnormal, as would be the case in the example given. The trainee then makes such tests as logic would dictate, testing signal, resistance and voltage at the various test points in such order as the trainee believes logical. As a check on his logic and the accuracy of his tests, he may be required to make a log noting the order of his tests and the results observed so that the instructor may analyze the trainee's logic and determine whether or not he has mastered the lesson or achieved the result more by luck than skill. After making such tests as he deems appropriate and actually as part of the tests, the trainee may make a component test at array 97 to determine whether or not he has properly identified the faulty component. If he has not, lamp 57 will light, and he may make further tests and component checks until he has solved the problem.

For purposes of illustrating the instructional features of the illustrated embodiment, the following example is provided. The student may grasp the test probe 88 and proceed to analyze the signal conditions of the circuit by placing the tip of the probe upon the fixed contacts of the stations designated by the symbol "△." The use of a test probe in this manner simulates the use of the test probe of an actual test instrument thereby providing realism for the student. As a result of this procedure, the student should conclude that an abnormal signal is present at the cathode, plate and output of the tube $V_1$.

The student may then place the test probe 88 upon the fixed contacts of the stations designated by the symbol "□." As a result of this procedure, the student should conclude that the circuit resistances are all of the proper value, thus excluding the possibility of a faulty circuit resistor. The student may then place the test probe 88 upon the central fixed contacts of the stations. As a result of this procedure, the student should conclude that the circuit voltages are all of the proper value. As a result of the plurality of aforementioned tests and by the application of appropriate reasoning, the student may then conclude that capacitor $C_2$ is defective. To verify this conclusion the student may place the test probe 88 upon the array 97 contact corresponding to $C_2$ and receive a verification of his conclusion by the illumination of the lamp 59.

The illustrated embodiment is but one example embodying certain features of this invention. As noted above, any circuit can be simulated in the same manner, the particular amplifier shown being merely illustrative. Indeed, hydraulic and pneumatic systems may be similarly simulated. The particular trouble introduced is merely exemplary. Any of the components may be chosen as faulty, with the connections for the same board being modified accordingly. There may also be multiple simultaneous failures. Further, the array 97 may be made generic to a great number of circuits and fashioned as a permanent part of the apparatus 11 rather than being part of the inserted card 93. Indeed, in some instances it may be desirable to have the card 93 permanently affixed to the apparatus 11. It is also within the scope of the present invention to have the test circuit wired for normal operation and to provide a trouble card for insertion in the apparatus which automatically switches appropriate connections for a particular faulty component. Alternatively, the circuit diagram may be illustrated upon one side of a card and the opposite side provided with an etched printed circuit corresponding to the circuit wiring previously discussed. A socket may be provided and the card plugged into the socket. Various cards may be thus provided, each having a different circuit depicted thereon with a particular trouble included. If desired the operation of the component test section may be placed under the control of the instructor, as by a remote switch, in order to prevent premature peeking at the answer before the student has completed the circuit analysis.

Thus, although but one specific embodiment of this invention has been hereinabove shown and described, it will be understood that details of the construction shown may be altered without departing from the spirit of this invention, as defined by the following claims.

What is claimed is:

1. A training apparatus particularly adapted to facilitate instructions in system, circuit or component failure analysis comprising a surface having illustrated thereupon a symbolic diagram of a system including a plurality of system components and with a plurality of test stations on said surface each of which is associated with a position along said system, a plurality of fixed contacts secured to said surface at each of said test stations, indicating means couplable to each of said fixed contacts, a probe selectively movable into contact with respective ones of said fixed contacts, and means operating when said movable contact is positioned upon a respective one of said fixed contacts for actuating said indicating means, said indicating means operating when so actuated to provide an indication of a particular system condition simulating the condition of the corresponding position in the system illustrated.

2. A training apparatus particularly adapted to facilitate instruction in system, circuit or component failure analysis comprising a surface having illustrated thereupon a symbolic diagram of an electrical circuit including a plurality of components and with a plurality of test stations on said surface each of which is associated with a terminal of one of said components, a plurality of fixed contacts secured to said surface at each of said test stations, an indicating means selectively couplable to each of said fixed contacts, a test probe coupled to said indicating means, said test probe being selectively movable into contact with respective ones of said fixed contacts, and means operating when said movable contact is positioned upon a respective one of said fixed contacts for actuating said indicating means, said indicating means operating when so actuated to provide an indication of a particular system condition simulating the condition at the corresponding component terminal of the circuit illustrated.

3. A training apparatus particularly adapted to facilitate instruction in system, circuit or component failure analysis comprising a surface having illustrated thereupon a symbolic diagram of a system including a plurality of system components and with a plurality of test stations on said surface each of which is associated with a position along said system, at least one of said test stations having first and second fixed contacts secured to said surface, a movable contact probe, first indicating means, means for electrically coupling said first indicating means between said first fixed contact and said probe, second indicating means, means for electrically coupling said second indicating means between said second fixed contact and said probe, and means operating when said movable contact is positioned upon one of said fixed contacts for actuating a respective one of said indicating means, said indicating means operating when so actuated to provide an indication of a particular system condition simulating a respective condition at the corresponding position in the system illustrated.

4. A training apparatus particularly adapted to facilitate instruction in system, circuit or component failure analysis comprising a surface having illustrated thereupon a symbolic diagram of an electrical circuit including a plurality of components and with a plurality of test stations on said surface each of which is associated with a terminal of one of said components, a first and a second fixed contact secured to said surface at each of said test stations, a plurality of first indicator lamps each having two terminals, means for selectively connecting each of said first fixed contacts to one terminal of one of said first indicator lamps, a plurality of second indicator lamps each having two terminals, means for selectively connecting each of said second fixed contacts to one terminal of one of said second indicator lamps, a movable contact probe coupled to the remaining terminals of said first and second indicator lamps, and means operable when said movable contact is disposed upon one of said fixed contacts a respective one of said indicator lamps will be caused to light to provide an indication of a particular system condition simulating a respective condition at the corresponding component terminal.

5. A training apparatus particularly adapted to facilitate instruction in system, circuit or component failure analysis comprising a surface having illustrated thereupon a symbolic diagram of an electrical circuit including a plurality of components and with a plurality of test stations each of which is associated with a terminal of one of said components, a first and a second fixed contact secured to said surface at each of said test stations, a plurality of first and second indicator lamps, means for selectively connecting each of said first fixed contacts to one terminal of one of said first indicator lamps and each of said second fixed contacts to one terminal of one of said second indicator lamps, a two terminal power supply having one terminal connected to the remaining terminal of said indicator lamps and the remaining terminal of said power supply connected to a movable contact probe so that when said movable contact is connected to one of said fixed contacts a respective one of said indicator lamps will be caused to light thereby providing an indication of a particular condition simulating a respective particular condition at the corresponding component terminal.

6. A training apparatus particularly adapted to facilitate instruction in system, circuit or component failure analysis comprising a surface having illustrated thereupon a symbolic diagram of a system including a plurality of system components and with a plurality of test stations on said surface each of which is associated with a position along said system, at least one of said test stations having first and second fixed contacts secured to said surface, a plurality of third fixed contacts secured to said surface, each of said third fixed contacts corresponding to a respective one of said system components, first, second and third indicating means, and a movable contact probe, means for electrically coupling said first, second and third indicating means between said movable contact probe and said first, second and third contacts, respectively whereby when said movable contact is positioned upon one of said first and second fixed contacts a respective one of said indicating means will be actuated, thereby providing an indication of a particular system condition simulating a respective particular condition at the corresponding position in the system illustrated and when said probe is positioned upon one of said third contacts an indication will be provided corresponding to the quality of the respective circuit component.

7. A training apparatus particularly adapted to facilitate instruction in system, circuit or component failure analysis comprising a surface having illustrated thereupon a symbolic diagram of an electrical circuit including a plurality of components and with a plurality of test stations on said surface each of which is associated with a terminal of one of said components, a plurality of first and second fixed contacts secured to said surface at said test stations, a plurality of first and second indicator lamps each having two terminals, means for detachably connecting each of said first contacts to one terminal of one of said first indicator lamps, means for detachably connecting each of said second fixed contacts to one terminal of one of said second indicator lamps, a plurality of third fixed contacts secured to said surface, each of said third contacts corresponding to a respective one of said components, a plurality of third indicator lamps each having two terminals, means for detachably connecting each of said third contacts to one terminal of one of said third indicator lamps, a two terminal power supply one terminal of which is connected to the remaining terminal of said indicator lamps, and a movable contact probe connected to the remaining terminal of said power supply so that when said movable contact is connected to one of said first and second fixed contacts a respective one of said indicator lamps will be caused to light thereby providing an indication of a particular system condition simulating a respective particular condition at the corresponding position in the system illustrated and when said probe is positioned upon one of said third contacts an indication will be provided corresponding to the quality of the respective circuit component.

8. A training apparatus particularly adapted to facilitate instruction in system, circuit or component failure analysis comprising a chassis, a test board with a surface having illustrated thereupon a symbolic diagram of a system including a plurality of system components and with a plurality of test stations on said surface each of which is associated with a position along said system, at least one of said test stations having first and second fixed contacts secured to said surface, means for removably mounting said board on said chassis, a movable contact probe, first indicating means mounted on said chassis, means for electrically coupling said first indicating means between said first fixed contact and said probe, second indicating means mounted on said chassis, means for electrically coupling said second indicating means between said second fixed contact and said probe, and means operating when said movable contact is positioned upon one of said fixed contacts for actuating a respective one of said indicating means, said indicating means operating when so actuated to provide an indication of a particular system condition simulating a respective condition at the corresponding position in the system illustrated.

References Cited
UNITED STATES PATENTS 3,071,876   1/1963   Swanberg _____ 35—19

EUGENE R. CAPOZIO, *Primary Examiner.*

H. S. SKOGGUIST, *Assistant Examiner.*